United States Patent
Li et al.

(10) Patent No.: US 9,327,476 B2
(45) Date of Patent: *May 3, 2016

(54) COMPATIBILIZED POLYMERIC COMPOSITIONS COMPRISING POLYOLEFIN-POLYLACTIC ACID COPOLYMERS AND METHODS OF MAKING THE SAME

(71) Applicant: FINA TECHNOLOGY, INC., Houston, TX (US)

(72) Inventors: Fengkui Li, Houston, TX (US); John Ashbaugh, Houston, TX (US); David Rauscher, Longview, TX (US); Robert Dotter, Fresno, TX (US)

(73) Assignee: FINA TECHNOLOGY, INC., Houston, TX (US)

(*) Notice: Subject to any disclaimer, the term of this patent is extended or adjusted under 35 U.S.C. 154(b) by 313 days.

This patent is subject to a terminal disclaimer.

(21) Appl. No.: 14/037,876

(22) Filed: Sep. 26, 2013

(65) Prior Publication Data

US 2014/0023869 A1  Jan. 23, 2014

Related U.S. Application Data

(63) Continuation of application No. 13/027,385, filed on Feb. 15, 2011, now Pat. No. 8,586,192.

(51) Int. Cl.
| | |
|---|---|
| *B32B 7/12* | (2006.01) |
| *B32B 27/08* | (2006.01) |
| *B32B 27/32* | (2006.01) |
| *B32B 27/36* | (2006.01) |
| *B32B 37/12* | (2006.01) |

(Continued)

(52) U.S. Cl.
CPC . *B32B 27/08* (2013.01); *B32B 7/12* (2013.01); *B32B 27/32* (2013.01); *B32B 27/36* (2013.01); *B29C 47/067* (2013.01); *B29C 47/36* (2013.01); *B32B 37/12* (2013.01); *B32B 2250/03* (2013.01); *B32B 2250/24* (2013.01); *B32B 2270/00* (2013.01); *B32B 2323/04* (2013.01); *B32B 2323/10* (2013.01); *B32B 2367/00* (2013.01); *C08J 3/005* (2013.01); *C08L 23/08* (2013.01); *C08L 23/14* (2013.01); *C08L 23/26* (2013.01); *C08L 67/04* (2013.01); *C09J 123/08* (2013.01); *C09J 123/14* (2013.01); *C09J 123/26* (2013.01); *C09J 167/04* (2013.01); *Y10T 428/31786* (2015.04); *Y10T 428/31797* (2015.04); *Y10T 428/31913* (2015.04); *Y10T 428/31938* (2015.04)

(58) Field of Classification Search
None
See application file for complete search history.

(56) References Cited

U.S. PATENT DOCUMENTS

| | | | |
|---|---|---|---|
| 2,758,987 | A | 8/1956 | Salzberg |
| 4,271,060 | A | 6/1981 | Hubby |

(Continued)

FOREIGN PATENT DOCUMENTS

| | | | |
|---|---|---|---|
| JP | 2006-326952 | * | 12/2006 |
| JP | 2008-037996 | * | 2/2008 |

(Continued)

*Primary Examiner* — Vivian Chen
(74) *Attorney, Agent, or Firm* — Albert Shung

(57) ABSTRACT

Polymeric compositions and processes of forming the same are described herein. The processes generally include contacting a polyolefin with a polylactic acid in the presence of at least 800 ppm of a radical initiator under extrusion conditions to produce a polyolefin-polylactic acid copolymer.

16 Claims, 2 Drawing Sheets

(51) Int. Cl.
*B29C 47/36* (2006.01)
*B29C 47/06* (2006.01)
*C08J 3/00* (2006.01)
*C08L 23/08* (2006.01)
*C08L 23/14* (2006.01)
*C08L 23/26* (2006.01)
*C08L 67/04* (2006.01)
*C09J 123/08* (2006.01)
*C09J 123/14* (2006.01)
*C09J 123/26* (2006.01)
*C09J 167/04* (2006.01)

(56) References Cited

U.S. PATENT DOCUMENTS

| | | | |
|---|---|---|---|
| 4,543,399 A | 9/1985 | Jenkins, III et al. | |
| 4,588,790 A | 5/1986 | Jenkins, III et al. | |
| 5,001,205 A | 3/1991 | Hoel | |
| 5,028,670 A | 7/1991 | Chinh et al. | |
| 5,236,998 A | 8/1993 | Lundeen et al. | |
| 5,310,865 A | 5/1994 | Enomoto et al. | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 6,147,173 A | 11/2000 | Holtcamp | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,323,307 B1* | 11/2001 | Bigg | C08L 57/00 524/306 |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,420,580 B1 | 7/2002 | Holtcamp et al. | |
| 6,607,834 B2* | 8/2003 | Davis | B29C 55/023 156/229 |
| 7,847,021 B2* | 12/2010 | Shinoda | C08L 51/06 428/480 |
| 8,530,577 B2* | 9/2013 | Li | B29C 45/72 524/502 |
| 8,586,192 B2* | 11/2013 | Li | B32B 7/12 428/480 |
| 9,034,990 B2* | 5/2015 | Li | B29C 45/72 524/502 |
| 2002/0123546 A1* | 9/2002 | Bigg | A61L 15/26 524/306 |
| 2007/0160861 A1* | 7/2007 | Shinoda | C08L 51/06 428/522 |
| 2009/0148713 A1* | 6/2009 | Lee | B32B 7/10 428/458 |
| 2009/0299011 A1* | 12/2009 | Wang | C08G 81/02 525/190 |
| 2011/0190447 A1* | 8/2011 | Li | B29C 45/72 525/64 |
| 2012/0035323 A1* | 2/2012 | Donnelly | C08L 23/10 525/64 |
| 2012/0065334 A1* | 3/2012 | Li | C08L 23/10 525/186 |
| 2013/0317173 A1* | 11/2013 | Li | B29C 45/72 525/64 |

FOREIGN PATENT DOCUMENTS

| | | | |
|---|---|---|---|
| JP | 2009-079104 | * | 4/2009 |
| JP | 2010-111738 | * | 5/2010 |

* cited by examiner

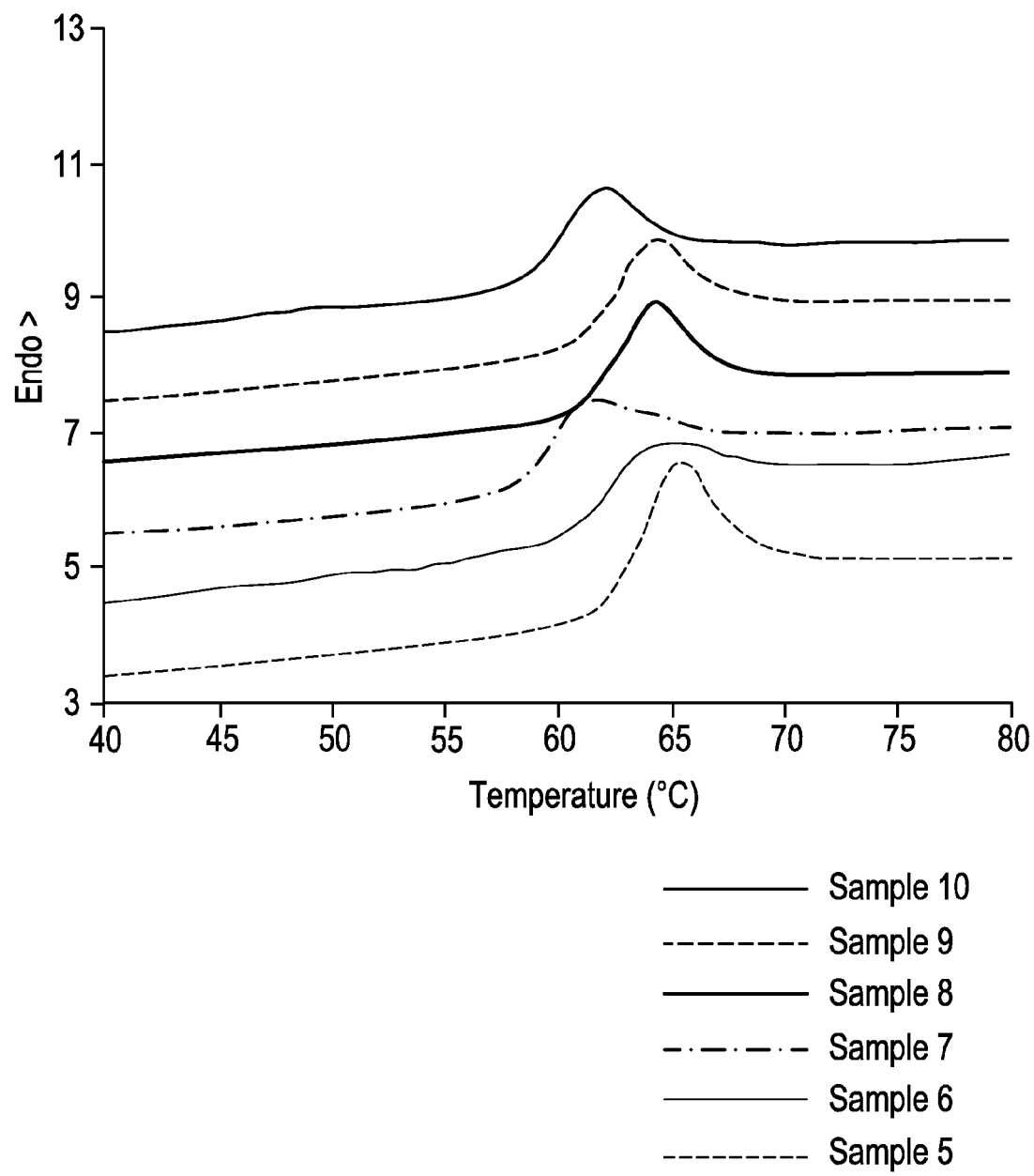

COMPATIBILIZED POLYMERIC COMPOSITIONS COMPRISING POLYOLEFIN-POLYLACTIC ACID COPOLYMERS AND METHODS OF MAKING THE SAME

CROSS-REFERENCE TO RELATED APPLICATIONS

This application is a continuation of U.S. application Ser. No. 13/027,385, filed on Feb. 15, 2011, U.S. Pat. No. 8,586,192.

FIELD

Embodiments of the present invention generally relate to polymeric compositions comprising a biopolymer.

BACKGROUND

Synthetic polymeric materials, such as polypropylene and polyethylene resins, are widely used in the manufacturing of a variety of end-use articles ranging from medical devices to food containers. While articles constructed from synthetic polymeric materials have widespread utility, these materials tend to degrade slowly, if at all, in a natural environment. In response to environmental concerns, interest in the production and utility of more readily biodegradable polymeric materials comprising polylactic acid, a biodegradable polymer, has been increasing. These polymeric materials, also known as "green materials", may undergo accelerated degradation in a natural environment.

However the utility of polymeric compositions comprising polylactic acid, such as blends of polyolefin and polylactic acid, is often limited by their poor mechanical and/or physical properties due, in part, to the inherent immiscibility of polyolefin and polylactic acid. To increase the adhesion between the polyolefin and the polylactic acid, a compatibilizing agent, also referred to herein as a compatibilizer, may be added to the blend to enhance adhesion at the interface between the polyolefin and polylactic acid molecules. However, the addition of a compatibilizing agent may have environmental drawbacks such as requiring the handling of toxic chemicals and the outgassing of volatiles not only during production but also from the end-use products or articles. Moreover, the addition of a compatibilizer increases the cost of formulating the polymeric materials. Thus, a need exists for polymeric compositions comprising polylactic acid that may be compatibilized in situ, without a need to add a compatibilizing agent additive as is typically required in formulating conventional polymeric compositions comprising polylactic acid.

SUMMARY

Embodiments of the present invention include processes for forming a polymeric composition. The processes generally include contacting a polyolefin with a polylactic acid in the presence of at least 800 ppm of a radical initiator under extrusion conditions to produce a polyolefin-polylactic acid copolymer.

One or more embodiments include the process of the preceding paragraph, wherein the radical initiator is selected to improve adhesion of the polyolefin and the polylactic acid over a blend of the polyolefin and polylactic acid absent the radical initiator.

One or more embodiments include the process of any preceding paragraph, wherein the polyolefin is selected from polypropylene, polyethylene, copolymers thereof and combinations thereof.

One or more embodiments include the process of any preceding paragraph, wherein the copolymer includes from about 30 wt. % to about 70 wt. % polyolefin.

One or more embodiments include the process of any preceding paragraph, wherein the polylactic acid is selected from poly(D-lactide), poly(L-lactide), and combinations thereof.

One or more embodiments include the process of any preceding paragraph, wherein the copolymer includes from about 30 wt. % to about 70 wt. % polylactic acid.

One or more embodiments include the process of any preceding paragraph, wherein the radical initiator is a peroxide.

One or more embodiments include the process of any preceding paragraph, wherein the peroxide is selected from 2,5-dimethyl-2,5-di-(tert-butylperoxy) hexane, 3,6,9-triethyl-3,6,9-trimethyl-1,4,7-triperoxonane, dicumyl peroxide, peroxydicarbonate, and combinations thereof.

One or more embodiments include the process of any preceding paragraph, wherein the peroxide contacts the polyolefin and polylactic acid in an amount of from about 800 ppm to about 20,000 ppm.

One or more embodiments include the process of any preceding paragraph, wherein the process further includes contacting the polyolefin, the polylactic acid or combinations thereof with a multifunctional monomer.

One or more embodiments include the process of any preceding paragraph, wherein the contact comprises melt blending the polyolefin with the polylactic acid in the presence of excess peroxides using a reactive extrusion process.

One or more embodiments include the process of any preceding paragraph further including combining the copolymer with a second polyolefin and a polyester to form a second polymeric blend.

One or more embodiments include the process of any preceding paragraph further including forming a multilayer film comprising a polyolefin layer, a polyester layer and a tie layer disposed between the polyolefin layer and the polyester layer, wherein the tie layer includes the copolymer.

One or more embodiments include a polymeric composition obtained by a process including contacting a polyolefin with a polylactic acid in the presence of at least 800 ppm of a peroxide to produce a polyolefin-polylactic acid copolymer.

One or more embodiments include the polymeric composition of the preceding paragraph, wherein the polyolefin is selected from polypropylene, polyethylene, copolymers thereof and combinations thereof.

One or more embodiments include the polymeric composition of any preceding paragraph, wherein the polyolefin is selected from polypropylene homopolymer, polypropylene-based random copolymer, and polypropylene heterophasic copolymer, and combinations thereof.

One or more embodiments include the polymeric composition of any preceding paragraph, wherein the copolymer includes from about 30 wt. % to about 70 wt. % polyolefin.

One or more embodiments include the polymeric composition of any preceding paragraph, wherein the polylactic acid is selected from poly(D-lactide), poly(L-lactide), and combinations thereof.

One or more embodiments include the polymeric composition of any preceding paragraph, wherein the copolymer includes from about 30 wt. % to about 70 wt. % polylactic acid.

One or more embodiments include the polymeric composition of any preceding paragraph, wherein the radical initiator is a peroxide.

One or more embodiments include the polymeric composition of any preceding paragraph, wherein the peroxide is selected from 2,5-dimethyl-2,5-di-(tert-butylperoxy) hexane, 3,6,9-triethyl-3,6,9-trimethyl-1,4,7-triperoxonane, dicumyl peroxide, peroxydicarbonate, and combinations thereof.

One or more embodiments include the polymeric composition of any preceding paragraph, wherein the peroxide contacts the polyolefin and polylactic acid in an amount of from about 800 ppm to about 20,000 ppm.

One or more embodiments include the polymeric composition of any preceding paragraph further including a multifunctional monomer.

One or more embodiments include a multilayer film including a polyolefin layer, a polyester layer and a tie layer disposed between the polyolefin layer and the polyester layer, wherein the tie layer includes the polymeric composition of any preceding paragraph.

One or more embodiments include the polymeric composition of any preceding paragraph, wherein the polymeric composition exhibits a Tg of a PLA phase that is lowered compared to an identical polymeric composition absent the radical initiator.

BRIEF DESCRIPTION OF DRAWINGS

FIG. 2 is a plot of the DSC melting endotherms as a function of temperature for the samples 5-10 in Example 2.

DETAILED DESCRIPTION

Figure 1:
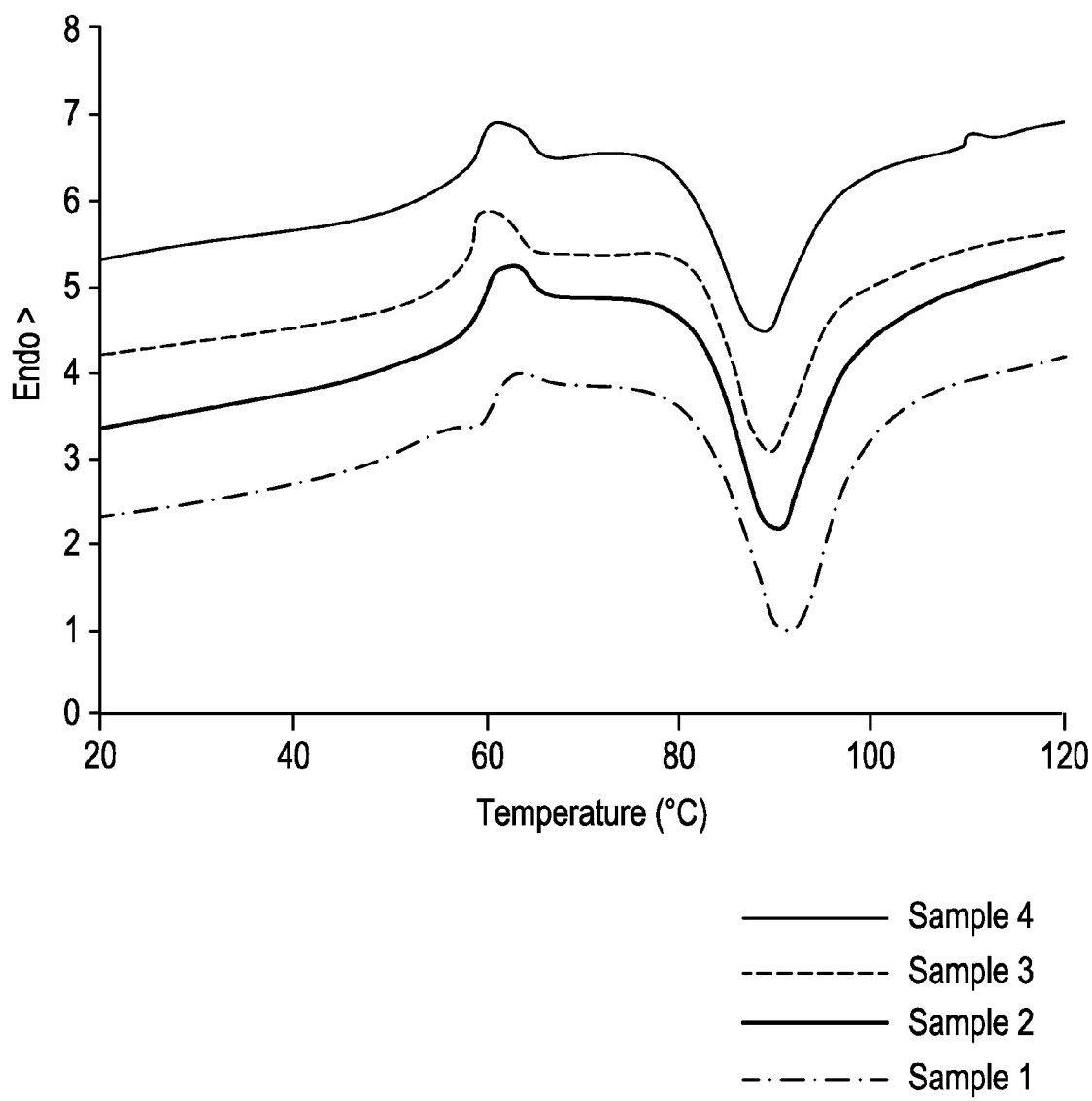
FIG. 1 is a plot of the DSC melting endotherms as a function of temperature for the samples 1-4 in Example 1.

A detailed description will now be provided. Each of the appended claims defines a separate invention, which for unfringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this disclosure is combined with available information and technology.

Various terms as used herein are defined below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Compatibilized polymeric compositions including biodegradable polymeric components and methods of making and using the same are described herein. Embodiments of the present invention provide compatibilized polymeric compositions comprising a polyolefin-polylactic acid copolymer produced by combining an olefin based polymer (i.e., polyolefin) and a polylactic acid in the presence of excess peroxides. In one or more embodiments, the compatibilized polymeric composition comprises a polyolefin, a polylactic acid, and a polyolefin-polylactic acid copolymer produced in situ by combining the polyolefin and the polylactic acid in the presence of excess peroxides. In one or more embodiments, the compatibilized polymeric composition may be formed into a wide variety of articles such as films, fibers, and hot melt adhesives, for example, by processing the compatibilized polymeric composition using common polymer processing techniques known to one of skill in the art. In one or more embodiments, the compatibilized polymeric composition may be used as a compatibilizer for directly compatibilizing a blend of a second polyolefin and a second polylactic acid (or other polyester) for forming a second compatibilized blend. In one or more embodiments, the compatibilized polymeric composition may be disposed as a tie layer between a polyolefin layer and a polylactic acid (or other polyester) layer in order to form a multilayer polymer.

Catalyst Systems

The polyolefins may be formed using any suitable catalyst system useful for polymerizing olefin monomers. For example, the catalyst system may include chromium based catalyst systems, single site transition metal catalyst systems including metallocene catalyst systems, Ziegler-Natta catalyst systems or combinations thereof, for example. The catalysts may be activated for subsequent polymerization and may or may not be associated with a support material, for example. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through $\pi$ bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, the catalyst systems are used to form olefin-based polymer compositions which are interchangeably referred to herein as polyolefins. Once the catalyst system is prepared, as described above and/or as known to one skilled in the art, a variety of processes may be carried out using the catalyst system to form olefin-based polymers. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359, 072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form olefin-based polymers. The olefin monomers may include $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. It is further contemplated that the monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidenenorbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat may be removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double-jacketed pipe or heat exchanger, for example.

Alternatively, other types of polymerization processes may be used, such as stirred reactors in series, parallel or combinations thereof, for example. Upon removal from the reactor, the olefin-based polymer (i.e., polyolefin) may be passed to a polymer recovery system for further processing, such as addition of additives and/or extrusion, for example.

Polymer Product

The compatibilized polymeric composition of the present invention may comprise one or more polyolefins. The polyolefin (and blends thereof) formed via the processes described herein may include, but are not limited to, linear low density polyethylene, elastomers, plastomers, high density polyethylenes, low density polyethylenes, medium density polyethylenes, polypropylene, polypropylene copolymers, copolymers thereof and combinations thereof, for example.

Unless otherwise designated herein, all testing methods are the current methods at the of filing.

In an embodiment, the polyolefin may comprise polypropylene, polyethylene, copolymers thereof or combinations thereof.

In an embodiment, the polyolefin may be a propylene-based polymer. As used herein, the term "propylene-based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

In one or more embodiments, the propylene-based polymer may be a polypropylene homopolymer, a polypropylene-based random copolymer, a polypropylene heterophasic copolymer, and combinations thereof.

In an embodiment, the propylene-based polymer may have a melting point ($T_m$) (as measured by differential scanning calorimetry) of at least about 110° C. or from about 110° C. to about 170° C. or from about 115° C. to about 170° C., for example.

The propylene-based polymer may have a melt-mass flow rate (MFR) (as determined in accordance with ASTM D-1238 condition "L") of from about 0.01 dg/min to about 1000 dg/min. or from about 0.5 dg/min. to about 30 dg/min., or from about 0.5 dg/min. to about 5 dg/min., for example. In an embodiment, the propylene-based polymer has a low melt flow rate. As used herein, the term low melt flow rate refers to a polymer having a MFR of less than about 10 dg/min., or in a range from about 0.5 dg/min. to about 10 dg/min., or less than about 6 dg/min., or in a range from about 0.5 dg/min. to about 6 dg/min., for example.

In an embodiment, the propylene-based polymer may be a polypropylene homopolymer. Unless otherwise specified, the term "polypropylene homopolymer" refers to propylene homopolymers, i.e., polypropylene, or those polyolefins composed primarily of propylene and may contain up to 0.5 wt. % of other comonomers, including but not limited to $C_2$ to $C_8$ alpha-olefins (e.g., ethylene and 1-butene), wherein the amount of comonomer is insufficient to change the amorphous or crystalline nature of the propylene polymer significantly. Despite the potential presence of small amounts of other comonomers, the polypropylene is generally referred to as a polypropylene homopolymer.

In an embodiment, the propylene-based polymer may be a polypropylene-based random copolymer. Unless otherwise specified, the term "propylene-based random copolymer" refers to those copolymers composed primarily of propylene and an amount of at least one comonomer, wherein the polymer includes at least about 0.5 wt. %, or at least about 0.8 wt. %, or at least about 2 wt. %, or from about 0.5 wt. % to about 5.0 wt. % comonomer relative to the total weight of the copolymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene, and combinations thereof. In one specific embodiment, the comonomer includes ethylene.

In an embodiment, the propylene-based polymer may be a polypropylene heterophasic copolymer (or impact copolymer). Polypropylene heterophasic copolymer refers to a semi-crystalline polypropylene or polypropylene copolymer matrix containing a heterophasic copolymer. The heterophasic copolymer includes ethylene and higher alpha-olefin polymer such as amorphous ethylene-propylene copolymer, for example. In one example, the heterophasic copolymer may comprise from about 6.0 wt. % to about 12 wt. %, or from about 8.5 wt. % to about 10.5 wt. %, or from about 9.0 wt. % to about 10.0 wt. % ethylene relative to the total weight of the copolymer.

In an embodiment, the propylene-based polymer may be formed from a metallocene catalyst. In another embodiment, the propylene-based polymer is formed from a Ziegler-Natta catalyst.

In an embodiment, the polyolefin may be an ethylene-based polymer. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. %, or at least about 90 wt. % polyethylene relative to the total weight of polymer, for example.

The ethylene-based polymer may be a homopolymer or a copolymer, for example a copolymer of ethylene with one or more alpha-olefin monomers such as propylene, butene, hexene, etc.

The ethylene-based polymer may have a density (as measured by ASTM D-792) of from about 0.86 g/cc to about 0.998 g/cc, or from about 0.88 g/cc to about 0.998 g/cc, or from about 0.90 g/cc to about 0.998 g/cc or from about 0.925 g/cc to about 0.998 g/cc, for example.

In an embodiment, the ethylene-based polymer has a high density. As used herein, the term "high density polyethylene" refers to ethylene-based polymer having a density of greater than about 0.945 g/cc, or in a range from about 0.946 g/cc to about 0.998 g/cc, or greater than about 0.948 g/cc, or in a range from about 0.998 g/cc, for example.

In an embodiment, the ethylene-based polymer may have a melting point ($T_m$) (as measured by differential scanning calorimetry) of at least about 120° C., or from about 120° C. to about 140° C., or from about 125° C. to about 140° C., for example.

The ethylene-based polymer may have a MFR (as measured in accordance with ASTM D-1238 condition "E") of from about 0.01 dg/min. to about 100 dg/min. or from about 0.5 dg/min. to about 30 dg/min., for example. In an embodiment, the ethylene-based polymer has a low MFR of less than about 10 dg/min., or in a range from about 0.5 dg/min. to about 10 dg/min., or less than about 6 dg/min., or in a range from about 0.5 dg/min. to about 6 dg/min., for example.

In an embodiment, the ethylene-based polymer may be formed from a metallocene catalyst. In another embodiment, the ethylene-based polymer is formed from a Ziegler-Natta catalyst.

The compatibilized polymeric composition may include at least 30 wt. %, or from about 30 wt. % to about 99 wt. %, or from about 30 wt. % to about 70 wt. %, or from about 35 wt. % to about 65 wt. % polyolefin based on the total weight of the compatibilized polymeric composition, for example.

The compatibilized polymeric composition further includes polylactic acid. The one or more polyolefins (PO) are contacted with polylactic acid (PLA) in the presence of excess peroxides to form a compatibilized polymeric composition (which may also be referred to herein as a compatibilized blend or compatibilized blended material). Such contact may occur by a variety of methods. For example, such contact may include blending of the polyolefin and the polylactic acid under conditions suitable for the formation of a blended material. Such blending may include dry blending, melt blending, melt compounding, or combinations thereof, by known blending techniques such as mixing and extrusion (e.g., twin-screw extrusion), for example.

The polylactic acid may include any polylactic acid capable of blending with an olefin-based polymer. For example, the polylactic acid may be selected from poly-L-lactide (PLLA), poly-D-lactide (PDLA), poly-LD-lactide (PDLLA) and combinations thereof. The polylactic acid may be formed by known methods, such as dehydration condensation of lactic acid (see, U.S. Pat. No. 5,310,865, which is incorporated by reference herein) or synthesis of a cyclic lactide from lactic acid followed by ring opening polymerization of the cyclic lactide (see, U.S. Pat. No. 2,758,987, which is incorporated by reference herein), for example. Such processes may utilize catalysts for polylactic acid formation, such as tin compounds (e.g., tin octylate), titanium compounds (e.g., tetraisopropyltitanate), zirconium compounds (e.g., zirconium isopropoxide), antimony compounds (e.g., antimony trioxide) or combinations thereof, for example.

In an embodiment, the polylactic acid may have a density of from about 1.228 g/cc to about 1.255 g/cc, or from about 1.23 g/cc to about 1.25 g/cc or from about 1.235 g/cc to about 1.245 g/cc (as determined in accordance with ASTM D792), for example.

In an embodiment, the polylactic acid may exhibit a crystalline melt temperature ($T_c$) of from about 140° C. to about 190° C., or from about 145° C. to about 185° C. or from about 150° C. to about 180° C. (as determined in accordance with ASTM D3418).

In an embodiment, the polylactic acid may exhibit a glass transition temperature (Tg) of from about 45° C. to about 85° C., or from about 50° C. to about 80° or from about 50° C. to about 70° C. (as determined in accordance with ASTM D3417).

In an embodiment, the polylactic acid may exhibit a tensile yield strength of from about 4,000 psi to about 25,000 psi, or from about 5,000 psi to about 10,000 psi or from about 5,500 psi to about 8,500 psi (as determined in accordance with ASTM D638), for example.

In an embodiment, the polylactic acid may exhibit a tensile elongation of from about 0.5% to about 10%, or from about 1.0% to about 8% or from about 1.5% to about 6% (as determined in accordance with ASTM D638), for example.

In an embodiment, the polylactic acid may exhibit a notched Izod impact of from about 0.1 ft-lb/in to about 0.8 ft-lb/in, or from about 0.2 ft-lb/in to about 0.6 ft-lb/in or from about 0.25 ft-lb/in to about 0.5 ft-lb/in (as determined in accordance with ASTM D256), for example.

The compatibilized polymeric composition may include from about 1 wt. % to about 70 wt. %, or from about 30 wt. % to about 70 wt. %, or from about 35 wt. % to about 65 wt. %, or from about 40 wt. % to about 60 wt. % polylactic acid based on the total weight of the compatibilized polymeric composition, for example.

The compatibilized polymeric compositions comprising polyolefin-polylactic acid copolymer may be produced by combining the polyolefin and the polylactic acid blend components in the presence of an excess of a radical initiator, such as peroxide. To promote coupling reactions between polyolefin and polylactic acid, the polyolefin and polylactic acid blend components may be initiated in the presence of excess peroxide. Examples of peroxides suitable for use in this disclosure include without limitation include known peroxides, such as benzoyl peroxide, tertiary butyl hydroperoxide, ditertiary butyl peroxide, hydrogen peroxide, potassium persulfate, methyl cyclohexyl peroxide, cumenehydroperoxide, acetyl benzoyl peroxide, tetralinhydroperoxide, phenylcyclohexanehydroperoxide, tertiary butyl peracetate, dicumyl peroxide, peroxydicarbonate, petertiary butyl perbenzoate, ditertiary amyl perphthalate, ditertiary butyl peradipate, tertiary amyl percarbonate and combinations thereof, for example. In one or more embodiments, the peroxide includes an organic peroxide. For example, the organic peroxides may include 2,5-dimethyl-2,5-di-(tert-butylperoxy)hexane which is commercially available as product Lupersol® 101 from Arkema, Inc., 3,6,9-triethyl-3,6,9-trimethyl-1,4,7-triperoxonane which is commercially available as product Trigonox® 301 from Akzo Nobel.

In an embodiment, the peroxide may be used (i.e., contact the polyolefin and polylactic acid blend components) in an excessive amount of at least about 800 ppm, or in a range from about 800 ppm to about 25,000 ppm or from about 2000 ppm to about 20,000 ppm, for example.

The compatibilized polymeric composition may be prepared by contacting the polyolefin (PO), PLA, and radical initiator under conditions suitable for the formation of a polymeric blend. For example, such contact may include melt blending, melt compounding or combinations thereof, by known blending techniques such as mixing and extrusion (e.g., twin-screw extrusion), for example. In an embodiment, the blend may be compatibilized by reactive extrusion of the PO and the PLA in the presence of an excess of peroxide (e.g., Lupersol 101) using, for example, a continuous mixer such as a mixer having an intermeshing co-rotating twin screw extruder for mixing and melting the components, to thereby form a compatibilized PO/PLA blend comprising polyolefin-polylactic acid copolymer.

The process for forming a compatibilized polymeric composition comprises contacting a polyolefin with a polylactic acid in the presence of an excess of a radical initiator, wherein a portion of the polyolefin and a portion of the polylactic acid (i.e., at the interfaces between the polyolefin phase and the polylactic acid phase) react to produce a polyolefin-polylactic acid copolymer capable of compatibilizing the polyolefin and the polylactic acid to thereby form a compatibilized blend. In particular, the polyolefin-polylactic acid copolymer is formed in situ by the radical initiator (i.e., peroxide) acting upon the polyolefin to generate free radical sites along the polyolefin chain that may react with a polylactic acid macro-free radical molecule. Polyolefins, such as propylene, ethylene and copolymers thereof, are responsive to peroxide-generated free radicals. Furthermore, radicals generated by peroxides are also able to abstract hydrogens (e.g., tertiary hydrogens) on both the polyolefin and the polylactic acid molecules. Thus, melt blending a polyolefin and polylactic acid in the presence of relatively excessive peroxide forms certain amounts of polyolefin-polylactic acid copolymer at the interfaces between the polyolefin and polylactic acid phases.

In an embodiment, any of the previously described compatibilized polymeric compositions may further comprise additives to impart desired physical properties, such as printability, increased gloss, or a reduced blocking tendency. Examples of additives may include, without limitation, stabilizers, ultra-violet screening agents, oxidants, anti-oxidants, anti-static agents, ultraviolet light absorbents, fire retardants, processing oils, mold release agents, coloring agents, pigments/dyes, fillers or combinations thereof, for example. These additives may be included in amounts effective to impart desired properties.

Product Application

In an embodiment, the compatibilized polymeric composition comprising polyolefin-polylactic acid copolymer may be utilized as a compatibilizer to a second polymeric blend comprising a second polyolefin and a polyester (e.g., polylactic acid) to compatibilize the second blend. For example, a compatibilized polymeric composition comprising polypropylene-polylactic acid copolymer produced by combining polypropylene and polylactic acid in the presence of excess peroxides, may be added to a second polypropylene and polylactic acid blend to directly compatibilize the second blend. In yet another example, a compatibilized polymeric composition comprising polyethylene-polylactic acid copolymer produced by combining polyethylene and polylactic acid in the presence of excess peroxides, may be added to a second polyethylene (or polypropylene) and polylactic acid blend to directly compatibilize the second blend. In another embodiment, the compatibilized polymeric composition and secondary blends thereof may be formed into a wide variety of articles such as films, dyeable fibers, and hot melt adhesives, for example, by polymer processing techniques known to one of skill in the art, such as forming operations including film, sheet, pipe and fiber extrusion and co-extrusion as well as blow molding, injection molding, rotary molding, and thermoforming, for example. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, hot melt adhesives, sheets, such as thermoformed sheets (including profiles and plastic corrugated cardboard), geomembranes and pond liners, for example. Molded articles include single and multilayered constructions in the form of bottles, tanks, large hollow articles, rigid food containers and toys, for example.

In yet another embodiment, the compatibilized polymeric composition comprising polyolefin-polylactic acid copolymer or secondary blends may be utilized to form a tie layer of a multilayer film. For example, a multilayer film may comprise a polyolefin (PO) layer, a PLA layer (or other polyester layer), and a tie layer disposed between the polyolefin layer and the PLA layer wherein the tie layer comprises the compatibilized polymeric composition, thereby connecting (tying) the polyolefin and PLA layers. The multilayer film may be formed by the addition of the compatibilized polymeric composition to a co-extrusion of the PO and PLA layers.

EXAMPLES

The following examples are given as particular embodiments of the disclosure and to demonstrate the practice and advantages thereof. It is understood that the examples are given by way of illustration and are not intended to limit the specification or the claims to follow in any manner.

In a first example, four samples were prepared to evaluate compatibilized polymeric compositions formed as a function of excess peroxide concentration. For comparison purposes, the first sample ("sample 1") was prepared by melt blending a propylene homopolymer having a 2.8 dg/min. melt flow rate, commercially available as Total 3371 ("PP 3371"), with a polylactic acid having a melt index (190° C., 2.16 kg) in a range from about 10 dg/min. to about 30 dg/min. (as determined in accordance with ASTM D1238), commercially available as NatureWorks® 3001D ("PLA 3001D"), to form a noncompatibilized blend ("PP 3371/PLA 3001D") referred to herein as the reference sample. The concentrations of the blend components PP 3371 and PLA 3001D were each about 50 wt. % based on the total weight of the blend. The second sample ("sample 2") is a compatibilized polymeric composition produced by melt blending 50 wt. % PP 3371 and 50 wt. % PLA 3001D in the presence of an excess of a peroxide commercially available as Lupersol® 101, wherein the peroxide was present in a concentration of about 2000 ppm. The third sample ("sample 3") is another compatibilized polymeric composition produced by melt blending 50 wt. % PP 3371 and 50 wt. % PLA 3001D in the presence of an excess of peroxide Lupersol® 101 having a concentration of about 5000 ppm. The fourth sample ("sample 4") is another compatibilized polymeric composition produced by melt blending 48 wt. % PP 3371, 50 wt. % PLA 3001D, and 2 wt. % polyethylene glycol (200) diacrylate in the presence of an excess of peroxide Lupersol® 101 having a concentration of about 2000 ppm. The polyethylene glycol (200) diacrylate is commercially available as product SR-259 ("SR259") from Sartomer Company, Inc. Each of the blends of samples 1-4 were prepared by melt blending the blend components using a reactive extrusion process. Formulations for samples 1-4 are summarized in Table 1.

Differential scanning calorimetry (DSC) was used to investigate the glass transition temperatures of the PLA phases in the blends of samples 1-4. FIG. 1 is a plot of the DSC melting endotherms as a function of temperature during the DSC heating scans of samples 1-4. The glass transitions temperatures (Tg) obtained from each of the endotherms in FIG. 1 are tabulated in Table 1

TABLE 1

| Sample | PP 3371 [wt. %] | PLA 3001D [wt. %] | SR259 [wt. %] | Lupersol ® 101 [ppm] | Tg [° C.] |
|---|---|---|---|---|---|
| 1 | 50 | 50 | — | — | 58.0 |
| 2 | 50 | 50 | — | 2000 | 56.6 |
| 3 | 50 | 50 | — | 5000 | 55.0 |
| 4 | 48 | 50 | 2 | 2000 | 54.6 |

The data shows that the use of excessive peroxide during blending of PP and PLA shifts the PLA phase Tg to lower temperatures, as compared to the reference sample 1 having a Tg of 58.0° C. The PLA phase Tg shifts of 1.4° C., 3° C., and 3.4° C., for samples 2-4, respectively, toward the lower PP glass transition temperature is the result of enhanced PP-PLA interphase interactions. In particular, the Tg shifts to lower temperatures means the PLA molecule motion is affected by the PP phases which have a Tg of about −6° C. This development of interaction between the PP and PLA phases is the in-situ formation of polypropylene-polylactic acid copolymers at the interfaces between the two phases. A comparison of samples 2 and 3 demonstrates that an increase in the concentration of peroxide from 2000 ppm to 5000 ppm causes a greater shift in the PLA phase Tg which indicates a higher concentration of polypropylene-polylactic acid copolymer in sample 3. Typically, the greater the Tg shift, the more effective the compatibilization. Thus, increasing the Lupersol® 101 peroxide concentration in the feed to a concentration of 5000 ppm (or more) increases the in-situ formation of polypropylene-polylactic acid copolymers. The further downward shift in the PLA phase Tg of sample 4, as compared to samples 2 and 3, demonstrates the most effective compatibilization and highest concentration of polypropylene-polylactic acid copolymer may be obtained by the participation of the acrylate monomer (SR259) to facilitate interlinking between the PP and PLA phases.

In a second example, six samples (samples 5-10) were prepared to evaluate compatibilized polymeric compositions formed as a function of different peroxides (Lupersol® 101 and Perkadox-24L) and their excess concentrations. In particular, compatibilization of sample blends formed using Lupersol® 101 which has two —O—O— groups per molecule is compared to the compatibilization of sample blends formed using a relatively weaker peroxide product Perkadox® 24L which has one —O—O— group per molecule. Product Perkadox® 24L is a dicetylperoxydicarbonate commercially available from Akzo Nobel. For comparison purposes, the fifth sample ("sample 5") was prepared by melt blending propylene homopolymer Total 3371 ("PP 3371") with a polylactic acid having a melt index (190° C., 216 kg) in a range from about 30 dg/min. to about 40 dg/min. (as determined in accordance with ASTM D1238), commercially available as NatureWorks® 3251D ("PLA 3251D"), to form a noncompatibilized blend ("PP 3371/PLA 3251D") referred to herein as the reference sample. The concentrations of the blend components PP 3371 and PLA 3251D were each about 50 wt. % based on the total weight of the blend. The sixth sample ("sample 6") is a compatibilized polymeric composition produced by melt blending 50 wt. % PP 3371 and 50 wt. % PLA 3251D in the presence of an excess of peroxide Lupersol® 101, wherein the peroxide was present in a concentration of about 2000 ppm. The seventh sample ("sample 7") is another compatibilized polymeric composition produced by melt blending 50 wt. % PP 3371 and 50 wt. % PLA 3251D in the presence of an excess of peroxide Lupersol® 101 having a concentration of about 5000 ppm. The eighth sample ("sample 8") is another compatibilized polymeric composition produced by melt blending 50 wt. % PP 3371 and 50 wt. % PLA 3251D in the presence of an excess of peroxide Perkadox® 24L having a concentration of about 2000 ppm. The ninth sample ("sample 9") and the tenth sample ("sample 10") are compatibilized polymeric compositions produced by melt blending 50 wt. % PP 3371 and 50 wt. % PLA 3251D in the presence of an excess of peroxide Perkadox® 24L having concentrations of about 5000 ppm and 20,000 ppm, respectively. Each of the blends of samples 5-10 were prepared by melt blending the blend components using a reactive extrusion process. Formulations for samples 5-10 are summarized in Table 2.

DSC was used to investigate the glass transition temperatures of the PLA phases in the blends of samples 5-10. FIG. 2 is a plot of the DSC melting endotherms as a function of temperature during the DSC heating scans of samples 5-10. The glass transitions temperatures (Tg) obtained from each of the endotherms in FIG. 2 are tabulated in Table 2.

TABLE 2

| Sample | PP 3371 [wt. %] | PLA 3251D [wt. %] | Lupersol ® 101 [ppm] | Perkadox ® 24L [ppm] | Tg [° C.] |
|---|---|---|---|---|---|
| 5 | 50 | 50 | — | — | 62.0 |
| 6 | 50 | 50 | 2000 | — | 60.2 |
| 7 | 50 | 50 | 5000 | — | 58.0 |
| 8 | 50 | 50 | — | 2000 | 60.8 |
| 9 | 50 | 50 | — | 5000 | 60.7 |
| 10 | 50 | 50 | — | 20,000 | 58.3 |

The data shows that the use of excessive peroxide during blending of the PP and the PLA in samples 6, 7, 8, 9 and 10 shifts the Tg of the PLA phase to lower temperatures (i.e., towards the Tg of the PP phase; Tg of about −6° C.) which indicates enhanced interactions between the phases in these compatibilized PP/PLA blends, as compared to the noncompatibilized PP/PLA blend of reference sample 5 having a Tg of 62.0° C. As previously discussed with respect to Example 1 above, the Tg shifts to lower temperatures indicate that the PLA molecule motion is affected by the PP phases as a result of in-situ formation of polypropylene-polylactic acid copolymers at the interfaces between the two phases. The PLA phase Tg shifts of 1.8° C. and 4.0° C. for samples 6 and 7, respectively, demonstrates that an increase in the concentration of Lupersol® 101 peroxide from 2000 ppm to 5000 ppm causes a greater shift in the PLA phase Tg which indicates a higher concentration of polypropylene-polylactic acid copolymer in sample 7. As previously mentioned, generally the greater the Tg shaft, the more effective the compatibilization. Thus, increasing the Lupersol® 101 peroxide concentration in the feed to a concentration of 5000 ppm (or more) increases the in-situ formation of polypropylene-polylactic acid copolymers. With regards to samples 8 and 9, the PLA phase Tg shifts of 1.2° C. and 1.3° C. for samples 8 and 9, respectively, demonstrate that an increase in the concentration of Perkadox® 24L peroxide from 2000 ppm to 5000 ppm causes little shift in the PLA phase Tg which indicates the in-situ formation of similarly low concentrations of polypropylene-polylactic acid copolymer in both samples 8 and 9. Whereas the larger PLA phase Tg shift of 3.7° C. for sample 10, as compared to samples 8 and 9, demonstrates that a significantly higher concentration (20,000 ppm) of the weaker peroxide Perkadox® 24L is required to achieve a greater degree of compatibilization, similar to the effect of the 5000 ppm of the stronger peroxide Lupersol® 101 in sample 7.

While the foregoing is directed to embodiments of the present invention, other and further embodiments of the invention may be devised without departing from the basic scope thereof and the scope thereof is determined by the claims that follow.

What is claimed is:

1. A multilayer film comprising a polyolefin layer, a polyester layer and a tie layer disposed between the polyolefin layer and the polyester layer, wherein the tie layer comprises a polyolefin-polylactic acid copolymer, a second polyolefin, and a polyester, wherein the polyolefin-polylactic acid copolymer is formed by contacting a polyolefin with a polylactic acid in the presence of at least 800 ppm of a radical initiator.

2. The multilayer film of claim 1, wherein the polyolefin of the polyolefin-polylactic acid copolymer is selected from polypropylene, polyethylene, copolymers thereof and combinations thereof.

3. The multilayer film of claim 1, wherein the polyolefin of the polyolefin-polylactic acid copolymer is selected from polypropylene homopolymer, polypropylene-based random copolymer, and polypropylene heterophasic copolymer, and combinations thereof.

4. The multilayer film of claim 1, wherein the polyolefin-polylactic acid copolymer comprises from about 30 wt. % to about 70 wt. % polyolefin.

5. The multilayer film of claim 1, wherein the polylactic acid is selected from poly(D-lactide), poly(L-lactide), and combinations thereof.

6. The multilayer film of claim 1, wherein the polyolefin-polylactic acid copolymer comprises from about 30 wt. % to about 70 wt. % polylactic acid.

7. The multilayer film of claim 1, wherein the polyolefin-polylactic acid copolymer comprises a multifunctional monomer.

8. A process comprising:
forming a multilayer film comprising a polyolefin layer, a polyester layer and a tie layer disposed between the polyolefin layer and the polyester layer, wherein the tie layer comprises a polyolefin-polylactic acid copolymer, a second polyolefin, and a polyester, and wherein the polyolefin-polylactic acid copolymer is formed by contacting a polyolefin and a polylactic acid in the presence of at least 800 ppm of a radical initiator.

9. The process of claim 8, wherein the polyolefin of the polyolefin-polylactic acid copolymer is selected from polypropylene, polyethylene, copolymers thereof and combinations thereof.

10. The process of claim 8, wherein the polyolefin of the polyolefin-polylactic acid copolymer is selected from polypropylene homopolymer, polypropylene-based random copolymer, and polypropylene heterophasic copolymer, and combinations thereof.

11. The process of claim 8, wherein the polyolefin-polylactic acid copolymer comprises from about 30 wt. % to about 70 wt. % polyolefin.

12. The process of claim 8, wherein the polylactic acid is selected from poly(D-lactide), poly(L-lactide), and combinations thereof.

13. The process of claim 8, wherein the polyolefin-polylactic acid copolymer comprises from about 30 wt. % to about 70 wt. % polylactic acid.

14. The process of claim 8, wherein the polyolefin-polylactic acid copolymer comprises a multifunctional monomer.

15. The process of claim 8, wherein, after contacting the polyolefin and the polylactic acid in the presence of at least 800 ppm of the radical initiator, the polyolefin-polylactic acid copolymer is combined with the second polyolefin and the polyester.

16. The process of claim 8, wherein contacting the polyolefin and the polylactic acid in the presence of at least 800 ppm of the radical initiator to form the polyolefin-polylactic acid copolymer comprises:
melt blending the polyolefin and the polylactic acid in the presence of at least 800 ppm of the radical initiator to form the polyolefin-polylactic acid copolymer;
melt compounding the polyolefin and the polylactic acid in the presence of at least 800 ppm of the radical initiator to form the polyolefin-polylactic acid copolymer; or
combinations thereof.

* * * * *